US 8,219,356 B2

(12) United States Patent
Mihok et al.

(10) Patent No.: US 8,219,356 B2
(45) Date of Patent: Jul. 10, 2012

(54) SYSTEM AND METHOD FOR DETECTING ANOMALIES IN WIND TURBINES

(75) Inventors: John Mihok, Albany, NY (US); Sameh R. Salem, Rexford, NY (US); Dhaval Bhalodia, Schenectady, NY (US); David Korim, Albany, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/977,792

(22) Filed: Dec. 23, 2010

(65) Prior Publication Data

US 2011/0270577 A1 Nov. 3, 2011

(51) Int. Cl.
*G06F 19/00* (2011.01)
*G06F 17/40* (2006.01)
(52) U.S. Cl. ......... 702/182; 73/147; 73/865.8; 340/679; 416/61; 702/34; 702/187
(58) Field of Classification Search .......... 73/147, 73/432.1, 865.8, 865.9, 866.3; 340/500, 340/540, 679, 680, 870.01, 870.07, 870.16; 416/61; 702/1, 33, 34, 35, 108, 113, 127, 702/182, 183, 187, 188, 189, 190, 191, 193, 702/199
See application file for complete search history.

(56) References Cited

U.S. PATENT DOCUMENTS

| | | | |
|---|---|---|---|
| 2,883,255 A * | 4/1959 | Anderson | 346/34 |
| 3,321,613 A * | 5/1967 | Searle | 702/182 |
| 6,973,396 B1 | 12/2005 | Shah et al. | |
| 7,017,079 B2 | 3/2006 | Gulati et al. | |
| 7,236,911 B1 | 6/2007 | Gough et al. | |
| 7,627,454 B2 | 12/2009 | LaComb et al. | |
| 2005/0267702 A1* | 12/2005 | Shah et al. | 702/81 |
| 2009/0030752 A1 | 1/2009 | Senturk-Doganaksoy et al. | |
| 2009/0030753 A1 | 1/2009 | Senturk-Doganaksoy et al. | |
| 2009/0100293 A1* | 4/2009 | LaComb et al. | 714/26 |
| 2009/0299780 A1 | 12/2009 | Sarkar et al. | |

* cited by examiner

*Primary Examiner* — Edward Cosimano
(74) *Attorney, Agent, or Firm* — James McGinness; Armstrong Teasdale LLP

(57) ABSTRACT

A device and method for use in detecting anomalies in wind turbines is provided. The method includes monitoring data acquired by at least one sensor in a first wind turbine, wherein the data is calculated to produce a value for a predetermined amount of time, monitoring data acquired by at least one sensor in a grouping of wind turbines similar to the first wind turbine, wherein the monitored data corresponds to the monitored data of the first wind turbine and is combined for a predetermined amount of time, and comparing the monitored data of the first wind turbine with the monitored data of the grouping of wind turbines. The method also includes generating a sensor error if the monitored data of the first wind turbine deviates more than a predetermined amount from the monitored data of the grouping of wind turbines, and displaying the results of the comparison of the monitored data.

18 Claims, 7 Drawing Sheets

SYSTEM AND METHOD FOR DETECTING ANOMALIES IN WIND TURBINES

BACKGROUND OF THE INVENTION

The subject matter described herein relates generally to operating wind turbines and, more particularly, to detecting anomalies within the wind turbines.

Wind turbines utilize sensors to monitor wind turbine performance and wind turbine components during operation. When a sensor within the wind turbine malfunctions or measures an operating condition outside of predefined limits, an error message or fault condition is produced. Often, the fault condition requires that the wind turbine be shut down, inspected, and reset to clear the fault condition. This downtime prevents the wind turbine from producing any energy. Accordingly, a method for predicting possible fault conditions is needed.

BRIEF DESCRIPTION OF THE INVENTION

In one aspect, a method for use in detecting anomalies in wind turbines is provided. The method includes monitoring data acquired by at least one sensor in a first wind turbine, wherein the data is calculated to produce a value for a predetermined amount of time, monitoring data acquired by at least one sensor in a grouping of wind turbines similar to the first wind turbine, wherein the monitored data corresponds to the monitored data of the first wind turbine and is combined for a predetermined amount of time, and comparing the monitored data of the first wind turbine with the monitored data of the grouping of wind turbines. The method also includes generating a sensor error if the monitored data of the first wind turbine deviates more than a predetermined amount from the monitored data of the grouping of wind turbines, and displaying the results of the comparison of the monitored data.

In another aspect, a device for use in for use in detecting anomalies in wind turbines is provided. The device includes a sensor interface configured to receive an operating condition at a plurality of times from one or more sensors associated with a first wind turbine, a communications interface configured to receive an operating condition at a plurality of times from one or more sensors associated with a grouping of wind turbines similar to the first wind turbine, a memory device coupled in communication with the sensor interface and the communications interface and configured to store a series of performance data samples that include an operating condition, and a processor coupled in communication with the memory device. The processor is programmed to compare a performance data sample of the first wind turbine with a performance data sample of the grouping of wind turbines, produce a sensor error if the performance data sample of the first wind turbine deviates more than a predetermined amount from the performance data sample of the grouping of wind turbines, and display the results of the comparison of the performance data sample.

In yet another aspect, one or more computer-readable storage media having computer-executable instructions embodied thereon are provided. When executed by at least one processor, the computer-executable instructions cause the processor to monitor data acquired by at least one sensor in a first wind turbine, wherein the data is calculated to produce a value for a predetermined amount of time, monitor data acquired by at least one sensor in a grouping of wind turbines similar to the first wind turbine, wherein the monitored data corresponds to the monitored data of the first wind turbine and is combined for a predetermined amount of time, and compare the monitored data of the first wind turbine with the monitored data of the grouping of wind turbines.

DETAILED DESCRIPTION OF THE INVENTION

Figure 1:
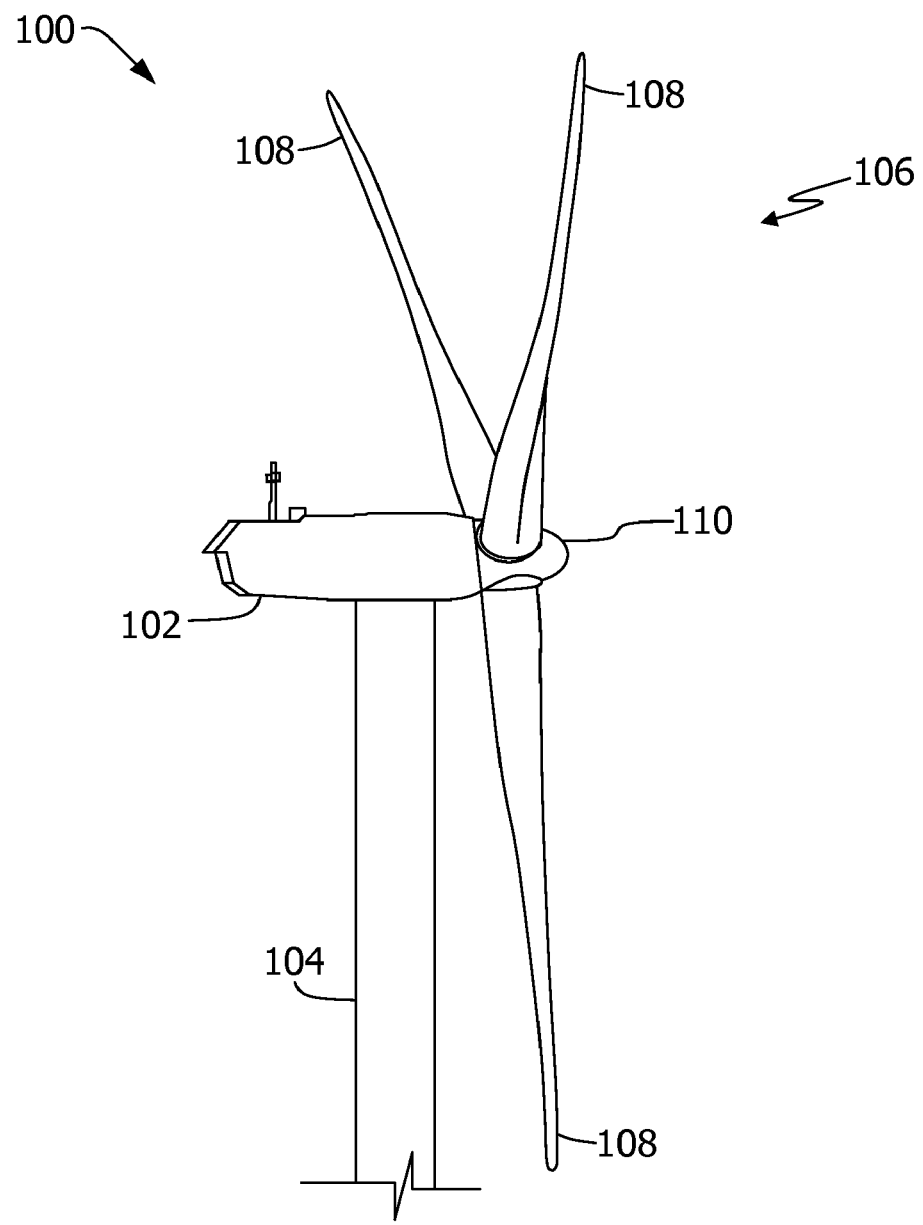
FIG. 1 is a perspective view of an exemplary wind turbine.

The embodiments described herein facilitate detecting anomalies in wind turbine operating conditions. FIG. 1 is a perspective view of an exemplary wind turbine 100. Wind turbine 100 includes a nacelle 102 that houses a generator (not shown in FIG. 1). Nacelle 102 is mounted on a tower 104 (only a portion of tower 104 is shown in FIG. 1). Tower 104 may have any suitable height that facilitates operation of wind turbine 100 as described herein. In an exemplary embodiment, wind turbine 100 also includes a rotor 106 that includes three rotor blades 108 coupled to a rotating hub 110. Alternatively, wind turbine 100 may include any number of rotor blades 108 that enable operation of wind turbine 100 as described herein. In an exemplary embodiment, wind turbine 100 includes a gearbox (not shown) that is rotatingly coupled to rotor 106 and to the generator.

Figure 2:
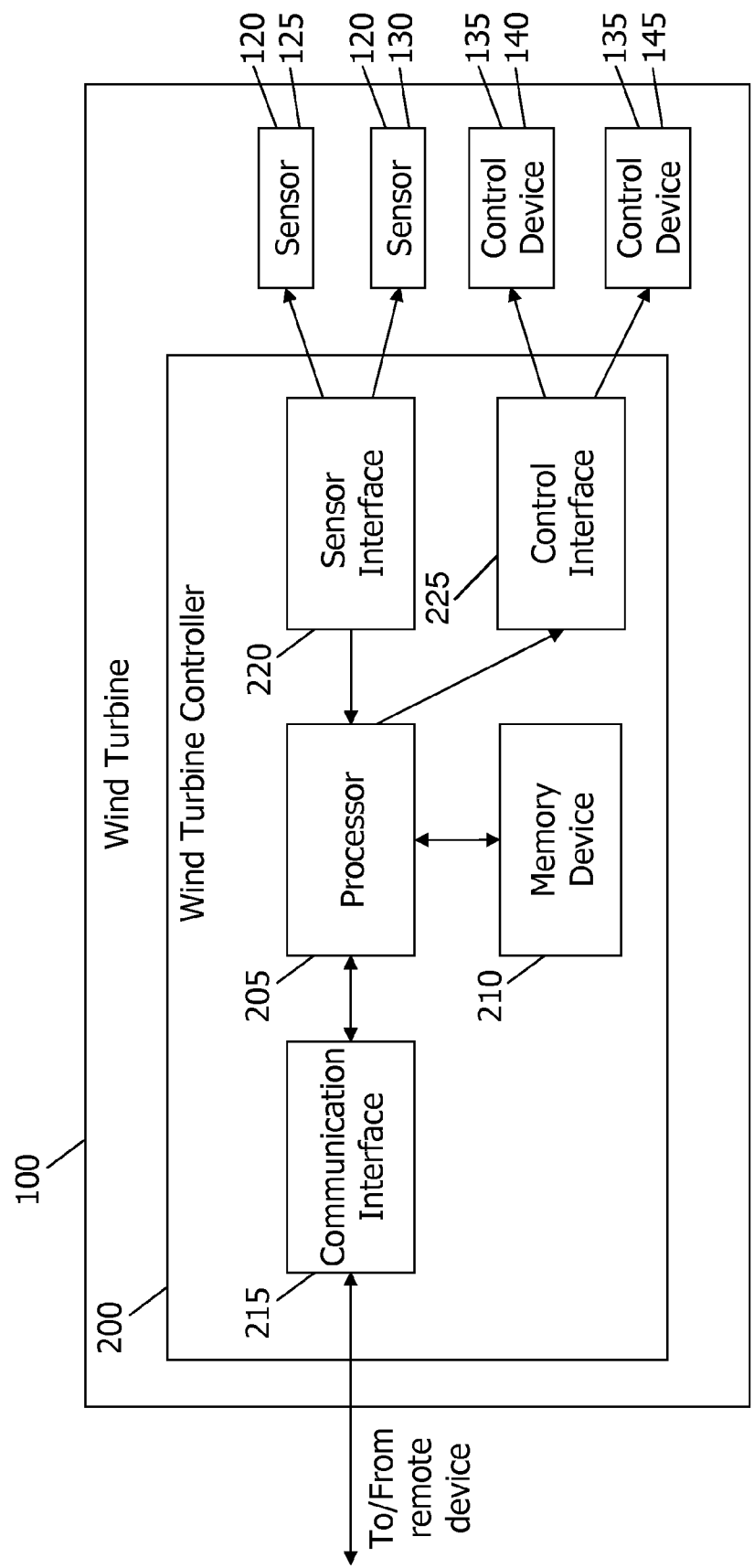
FIG. 2 is a block diagram illustrating an exemplary wind turbine controller for use with the wind turbine shown in FIG. 1.

In some embodiments, wind turbine 100 includes one or more sensors 120 and/or control devices 135 (shown in FIG. 2). Sensors 120 sense or detect wind turbine operating conditions. For example, sensor(s) 120 may include a wind speed and/or a direction sensor (e.g., an anemometer), an ambient air temperature sensor, an air density sensor, an atmospheric pressure sensor, a humidity sensor, a power output sensor, a blade pitch angle sensor, a turbine rotor speed sensor, a component temperature sensor, a tower acceleration sensor, and/or any sensor suitable for use with wind turbine 100. Each sensor 120 is located according to its function. For example, an anemometer may be positioned on an outside surface of nacelle 102, such that the anemometer is exposed to air surrounding wind turbine 100. Each sensor 120 generates and transmits one or more signals corresponding to a detected operating condition. For example, an anemometer transmits a signal indicating a wind speed and/or a wind direction. Moreover, each sensor 120 may transmit a signal continuously, periodically, or only once, for example, though other signal timings are also contemplated.

Control devices 135 are configured to control an operation of wind turbine 100 and may include, without limitation, a brake, a relay, a motor, a solenoid, and/or a servomechanism. A control device 135 may adjust a physical configuration of wind turbine 100, such as an angle or pitch of rotor blades 108 and/or an orientation of nacelle 102 or rotor 106 with respect to tower 104.

FIG. 2 is a block diagram illustrating an exemplary wind turbine controller 200 for use with wind turbine 100. Wind turbine controller 200 includes a processor 205 for executing instructions and a memory device 210 configured to store data, such as computer-executable instructions and operating conditions.

Wind turbine controller 200 also includes a communications interface 215. Communications interface 215 is configured to be coupled in signal communication with one or more remote devices, such as another wind turbine controller 200 and/or a computing device (shown in FIG. 3). In one embodiment, communications interface 215 is configured to receive one or more signals from at least one wind turbine controller 200 at a plurality of times. In an alternative embodiment, communications interface 215 is configured to receive a plurality signals from a plurality wind turbines 100 and/or wind turbine controllers 200 at a plurality times.

In some embodiments, wind turbine controller 200 includes one or more sensor interfaces 220. Sensor interface 220 is configured to be communicatively coupled to one or more sensors 120, such as a first sensor 125 and a second sensor 130, and may be configured to receive one or more signals from each sensor 120 at a plurality of times. Sensor interface 220 facilitates monitoring and/or operating wind turbine 100. For example, wind turbine controller 200 may monitor operating conditions (e.g., wind speed, wind direction, rotor speed, and/or power output) of wind turbine 100 based on signals provided by sensors 120. Memory device 210 may be configured to store the operating conditions. For example, a history of operating conditions may be stored in memory device 210.

In some embodiments, wind turbine controller 200 also includes a control interface 225, which is configured to be communicatively coupled to one or more control devices 135, such as a first control device 140 and a second control device 145. In one embodiment, wind turbine control interface 225 is configured to operate control device 135 including a brake to prevent rotor 106 (shown in FIG. 1) from rotating. In addition, or in the alternative, wind turbine control interface 225 may operate a control device 135 including a blade pitch servomechanism to adjust one or more rotor blades 108 (shown in FIG. 1) to a desired and/or predetermined pitch. The brake and the blade pitch servomechanism may be operated by the same control device 135 or a first control device 135 and a second control device 135.

In some embodiments, wind turbine controller 200 is configured to operate control devices 135 to achieve a desired noise level and/or a desired power output. For example, wind turbine 100 may be operated in a curtailed state by adjusting the blade pitch to reduce power output.

Figure 3:
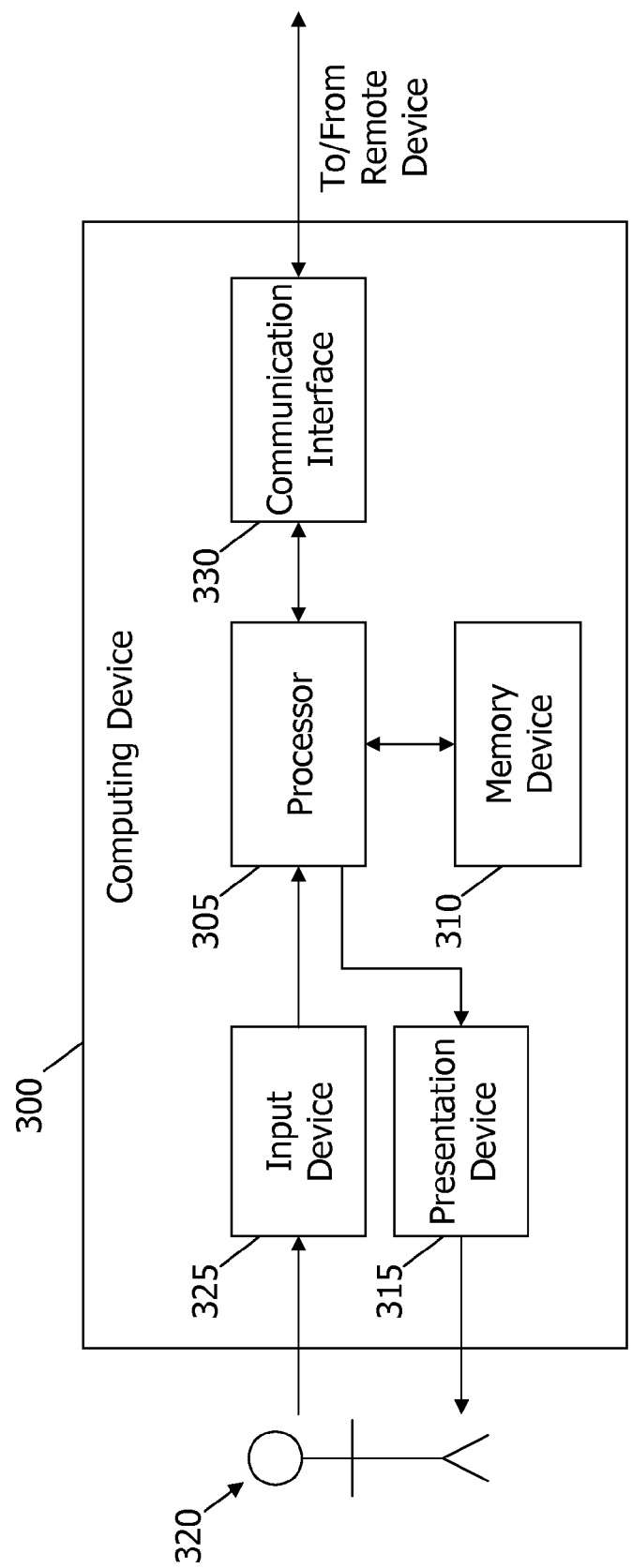
FIG. 3 is a block diagram illustrating an exemplary computing device.

FIG. 3 is a block diagram illustrating an exemplary computing device 300. Computing device 300 includes a processor 305 for executing instructions. In some embodiments, executable instructions are stored in a memory device 310. Memory device 310 is any device allowing information, such as executable instructions and/or other data, to be stored and retrieved.

In some embodiments, computing device 300 includes at least one presentation device 315 for presenting information to user 320. Presentation device 315 is any component capable of conveying information to user 320. Presentation device 315 may include, without limitation, a display device (e.g., a liquid crystal display (LCD), organic light emitting diode (OLED) display, or "electronic ink" display) and/or an audio output device (e.g., a speaker or headphones). In some embodiments, presentation device 315 includes an output adapter, such as a video adapter and/or an audio adapter. An output adapter is operatively coupled to processor 305 and configured to be operatively coupled to an output device, such as a display device or an audio output device. In some embodiments, presentation device 315 is configured to present wind turbine information, such as the possible and/or actual power output of one or more wind turbines 100 (shown in FIG. 1) to user 320.

In some embodiments, computing device 300 includes an input device 325 for receiving input from user 320. Input device 325 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of presentation device 315 and input device 325. Computing device 300 also includes a communication interface 330, which is configured to be communicatively coupled to one or more wind turbine controllers 200 and/or one or more other computing devices 300.

Stored in memory device 310 are, for example, computer-readable instructions for detecting anomalies in wind turbines, providing a user interface to user 320 via presentation device 315, and/or receiving and processing input from input device 325. In addition, or alternatively, memory device 310 may be configured to store operating conditions, power output measurements, performance data samples, and/or any other data suitable for use with the methods described herein.

Figure 4:
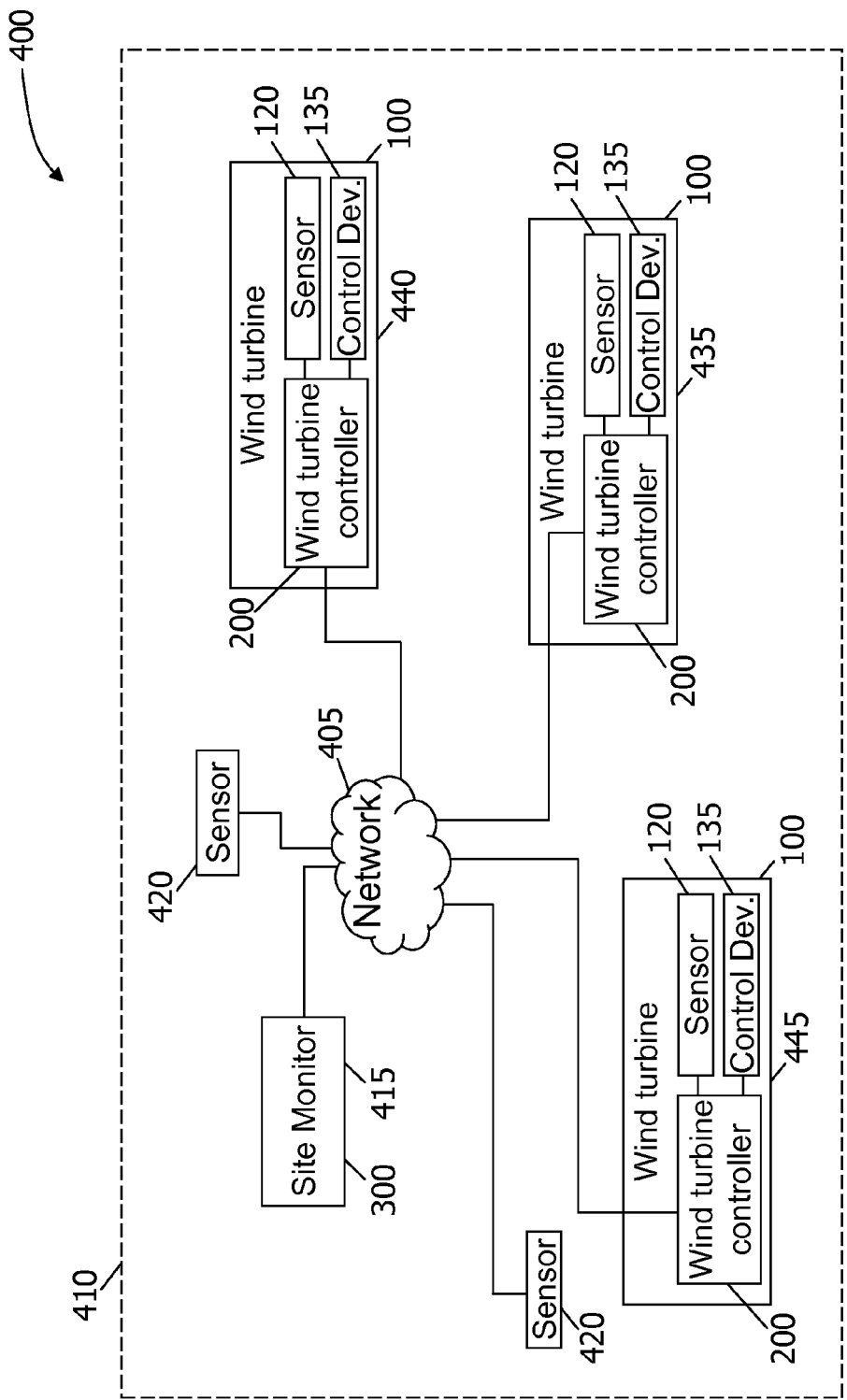
FIG. 4 is a block diagram illustrating an exemplary computing system for use in detecting anomalies within one or more wind turbines, such as the wind turbine shown in FIG. 1.

FIG. 4 is a block diagram illustrating an exemplary computing system 400 for use in determining a possible power output of one or more wind turbines 100, 435, 440, and 445. System 400 includes a network 405. For example, network 405 may include, without limitation, the Internet, a local area network (LAN), a wide area network (WAN), a wireless LAN (WLAN), a mesh network, and/or a virtual private network (VPN).

In an exemplary embodiment, a wind turbine site 410 includes a plurality of wind turbines 100, each of which includes a wind turbine controller 200. One or more computing devices 300 (shown in FIG. 3), such as a site monitor 415, are configured to be coupled in signal communication with wind turbine controllers 200 via network 405.

In an exemplary embodiment, site monitor 415 is positioned at wind turbine site 410. Alternatively, site monitor 415 may be positioned outside wind turbine site 410. For example, site monitor 415 may be communicatively coupled to and may interact with wind turbine controllers 200 at a plurality of wind turbine sites 410.

Each of site monitor 415 and wind turbine controller 200 includes a processor, (shown in FIGS. 2 and 3). A processor may include a processing unit, such as, without limitation, an integrated circuit (IC), an application specific integrated circuit (ASIC), a microcomputer, a programmable logic controller (PLC), and/or any other programmable circuit. A processor may include multiple processing units (e.g., in a multi-core configuration). Each of site monitor 415 and wind turbine controller 200 is configurable to perform the operations described herein by programming the corresponding processor. For example, a processor may be programmed by encoding an operation as one or more executable instructions and providing the executable instructions to the processor in a memory device (also shown in FIGS. 2 and 3) that is coupled to the processor. A memory device may include, without limitation, one or more random access memory (RAM) devices, one or more storage devices, and/or one or more computer-readable media.

In some embodiments, one or more operating condition sensors 420 are coupled in communication with site monitor 415 and/or wind turbine controllers 200 (e.g., via network 405). Operating condition sensors 420 are configured to indicate an operating condition, such as a meteorological condition at a corresponding geographic position. For example, operating condition sensors 420 may be configured to indicate a wind speed and/or a wind direction. An operating condition sensor 420 may be positioned apart from wind turbines 100 to facilitate reducing interference from wind turbines 100 with the operating condition indicated by operating condition sensor 420. For example, wind turbines 100 may affect airflow, and therefore wind speed, within the vicinity of wind turbines 100. In addition, or alternatively, it may be assumed that interference by wind turbines 100 with measured operating conditions is relatively consistent, such that methods described herein are not adversely affected by such interference.

Figure 5:
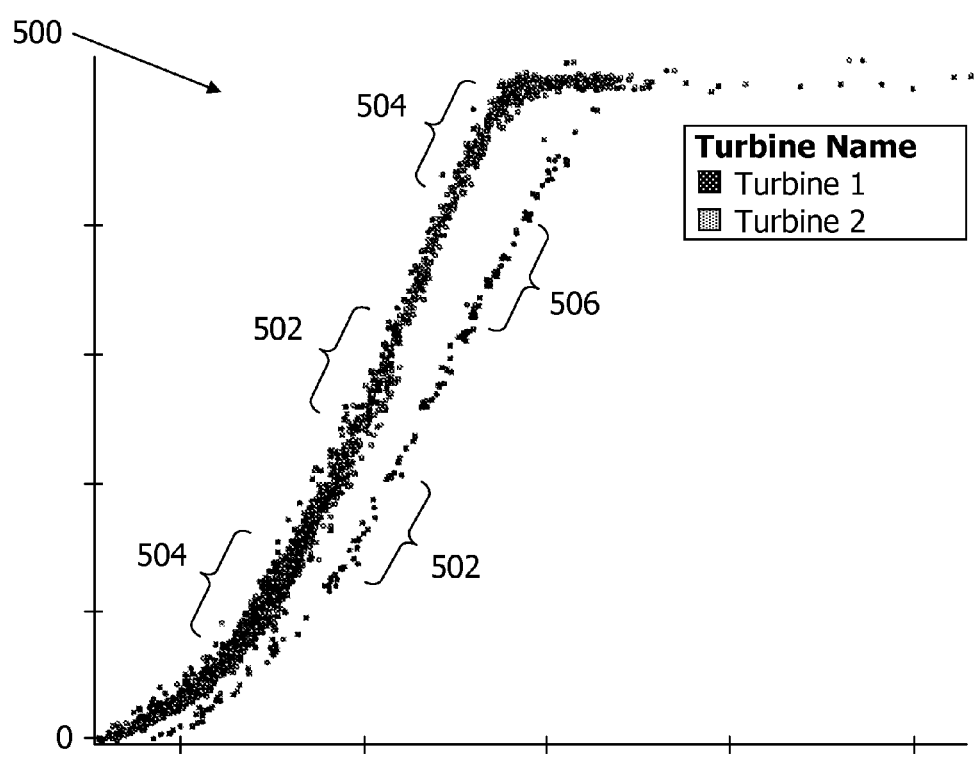
FIG. 5 is a graph illustrating power output of a wind turbine, such as the wind turbine shown in FIG. 1, relative to wind speed.
Figure 6:
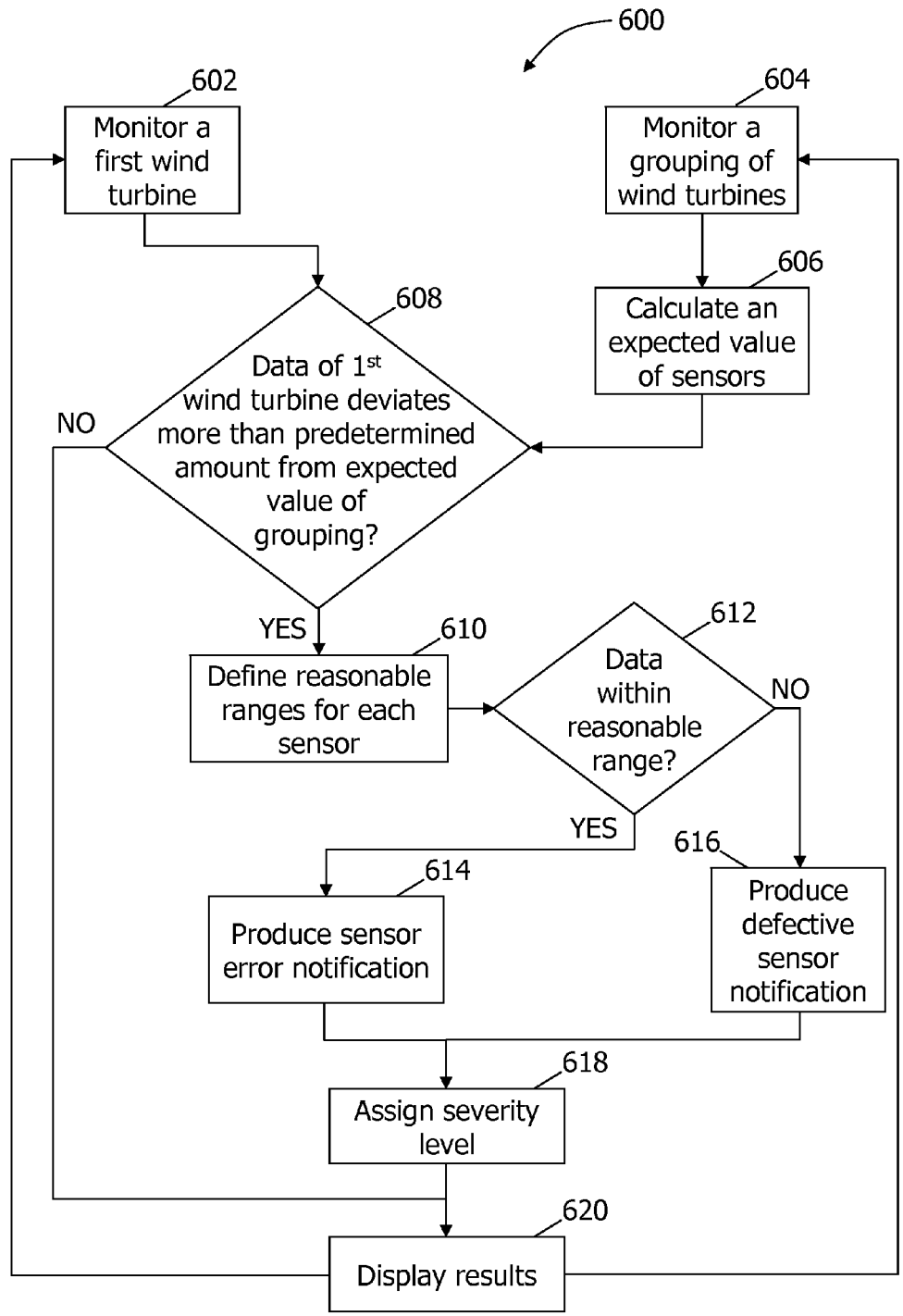
FIG. 6 is a flowchart of an exemplary method for use in detecting anomalies within a wind turbine, such as the wind turbine shown in FIG. 1

FIG. 5 is a graph 500 illustrating power output of a wind turbine relative to wind speed. FIG. 6 is a flowchart of an exemplary method 600 for use in detecting anomalies of a wind turbine 100.

Graph 500 illustrates power output of a wind turbine relative to wind speed. Data points 502 represent performance data samples for an exemplary wind turbine 100. Data points 504 represent typical performance data when wind turbine 100 is in proper configuration. Data points 506 represent outliers or anomalies to typical performance data. In one embodiment, a blade offset causes data points 506 to deviate from the typical performance data plot.

Method 600 facilitates the detecting of anomalies 506 of a wind turbine 100. Referring to FIGS. 4 and 6, in an exemplary embodiment, method 600 is performed by site monitor 415 and/or wind turbine controllers 200. In the exemplary embodiment, all data from sensors 120 of a first wind turbine 100 is monitored 602. In an exemplary embodiment, wind turbine controller 200 acquires a series of performance data samples. Each performance data sample includes an operating condition (e.g., a measured wind speed, in meters/second) and a power output (e.g., in kilowatts).

In one embodiment, performance data samples are taken in the range of 1 second to 1 day and a value is calculated based on the performance data samples. In the exemplary embodiment, an average is calculated for the given time period. Alternatively, any calculation can be performed on the performance data samples to produce a value that enables the current disclosure to function as described herein including, but not limited to, calculating a median value, calculating a mean value, and calculating a mode value. In an alternative embodiment, performance data samples are acquired real-time. Alternatively, performance data samples can be taken for any for any time period that allows the current disclosure to function as described herein. In the exemplary embodiment, the performance data samples are taken at 10 minute intervals and measured as an average for the 10 minute period. In one embodiment, the operating condition and the power output are associated with a time at which the values were indicated by a sensor 120.

Parallel to the first wind turbine 100, all data from sensors 120 from a grouping of similar wind turbines is monitored 604 to acquire performance data samples. In the exemplary embodiment, the grouping includes at least two wind turbines. In an alternative embodiment, the grouping includes one similar wind turbine. Wind turbines 100 may be considered similar based on having the same model designation and/or similar or identical components, being located in the same wind turbine site 410, being situated in a location having similar geographic features, and/or being installed in the same year. For example, a wind turbine located in a valley on one continent may be determined to be similar to a wind turbine located in a valley on a different continent. Alternatively, wind turbines 100 may be considered similar based on any criteria that will facilitate the detection of anomalies as described herein.

In the exemplary embodiment, the performance data samples from the grouping of similar wind turbines are combined and an expected value is calculated 606 to produce one performance data sample for the grouping. In the exemplary embodiment, the expected value is calculated 606 by averaging the performance data samples. Alternatively, the expected value may be calculated 606 any way that will allow the current disclosure to function as described herein including, but not limited to, calculating a median, calculating a mode, and calculating a mean.

In the exemplary embodiment, the performance data from the first wind turbine 100 is compared 608 with the calculated 606 expected value of the grouping of similar wind turbines 100. In the exemplary embodiment, site monitor 415 and/or wind turbine controller 200 compares 608 the performance data to identify statistical outliers. Outliers are determined when performance data of the first wind turbine 100 deviates more than a predetermined amount from the calculated 606 expected value of the grouping of similar wind turbines 100. The predetermined amount can include calculating any form of deviation including an absolute deviation (e.g. 5° or 50 rpm), a relative deviation (e.g. +/−5%), and/or a standard deviation (e.g. 1, 2, or 3). In the exemplary embodiment, the predetermined amount is 2 two standard deviations.

If the comparison 608 finds the performance data of the first wind turbine not to deviate more than the predetermined amount from the performance data of the grouping of similar wind turbines, the results are displayed 620. If the comparison 608 finds the performance data of the first wind turbine to deviate more than the predetermined amount from the performance data of the grouping of similar wind turbines, reasonable ranges for each sensor are defined 610, such that wind turbine controller 200 may filter 612 performance data samples. In one embodiment, reasonable ranges are defined 610 to identify defective sensors by the data they are reporting (e.g., a wind speed below 0 meters/second). In one embodiment, unreasonable values are filtered 612 from the acquired performance data samples and a sensor error notification 614 is produced. In the exemplary embodiment, if the performance data sample is outside the defined 610 reasonable range, a defective sensor notification is produced 616.

Whether a sensor error notification 614 or a defective sensor notification is produced 616, the notifications 614 and 616 are assigned 618 a severity level (e.g. 1, 2, and 3). In one embodiment, the assigned 618 severity level corresponds with a criticality of the notification produced 614 and 616. For example, an assigned 618 severity level of 1 may require wind turbine 100 to be shut down and checked, while an assigned 618 severity level of 2 may represent an underperforming sensor that can be checked during routine maintenance. In the exemplary embodiment, after a severity level is assigned 618 to a produced 614 and 616 notification, results are displayed 620. In one embodiment, the results are displayed 620 on a graph showing the performance data of the first wind turbine 100 versus the performance data of the grouping of similar wind turbines 100. Alternatively, the results are displayed 620 on a spreadsheet.

Figure 7:
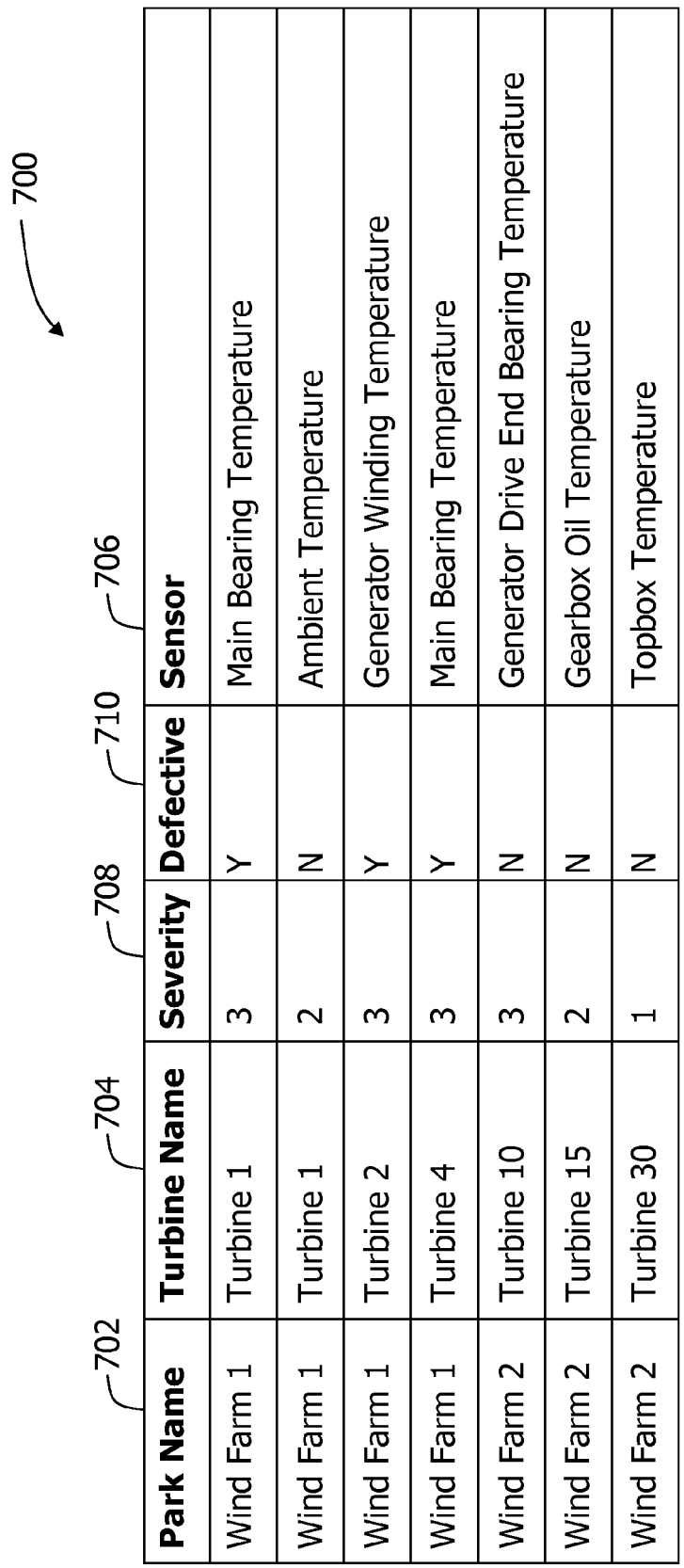
FIG. 7 is an exemplary user interface providing a graphical representation of the displayed results shown in FIG. 6.

FIG. 7 is an exemplary user interface 700 providing a graphical representation of the displayed 620 results for wind turbines 100. As shown in FIG. 7, the produced 614 and 616 notifications are displayed. User interface 700 may be displayed by user computer device 300 and/or presentation device 315, for example. User interface 700 includes a turbine park name 702, a turbine name 704, and a sensor name 706. Additionally, the assigned 618 severity levels 708, and the produced 616 defective sensor notification 710 are displayed. Such an embodiment facilitates quickly comparing outliers.

Embodiments provided herein facilitate detecting anomalies in wind turbines. Exemplary embodiments of a wind turbine control system are described above in detail. The system, devices, wind turbine, and included assemblies are not limited to the specific embodiments described herein, but rather each component may be utilized independently and separately from other components described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for use in detecting anomalies in wind turbines, the method comprising:
    monitoring data acquired by at least one sensor in a first wind turbine, wherein the data is calculated to produce a value for a predetermined amount of time;
    monitoring data acquired by at least one sensor in a grouping of wind turbines similar to the first wind turbine, wherein the monitored data corresponds to the monitored data of the first wind turbine and is combined for a predetermined amount of time;
    comparing the monitored data of the first wind turbine with the monitored data of the grouping of wind turbines;
    generating a sensor error if the monitored data of the first wind turbine deviates more than a predetermined amount from the monitored data of the grouping of wind turbines; and,
    displaying the results of the comparison of the monitored data.

2. A method in accordance with claim 1, further comprising assigning a severity level to the produced sensor error.

3. A method in accordance with claim 1, wherein monitoring data acquired by at least one sensor in a grouping of wind turbines similar to the first wind turbine comprises monitoring data acquired by at least one sensor in a respective wind turbine that is in a grouping of wind turbines similar to the first wind turbine.

4. A method in accordance with claim 1, wherein monitoring data acquired by at least one sensor in a grouping of wind turbines similar to the first wind turbine comprises monitoring data acquired by at least one sensor in at least one of a grouping of wind turbines situated in a similar geographic location to the first wind turbine, a grouping of wind turbines installed in the same year as the first wind turbine, and a grouping of wind turbines being the same model as the first wind turbine.

5. A method in accordance with claim 1, further comprising defining a reasonable range of data for each of the at least one sensors.

6. A method in accordance with claim 5, further comprising determining if the monitored data of the first wind turbine is within the defined reasonable range.

7. A device for use in detecting anomalies in wind turbines, the device comprising:
    a sensor interface configured to receive an operating condition at a plurality of times from one or more sensors associated with a first wind turbine;
    a communications interface configured to receive an operating condition at a plurality of times from one or more sensors associated with a grouping of wind turbines similar to the first wind turbine;
    a memory device coupled in communication with the sensor interface and the communications interface and configured to store a series of performance data samples that include an operating condition; and,
    a processor coupled in communication with the memory device and programmed to:
    compare a performance data sample of the first wind turbine with a performance data sample of the grouping of wind turbines;
    produce a sensor error if the performance data sample of the first wind turbine deviates more than a predetermined amount from the performance data sample of the grouping of wind turbines; and,
    display the results of the comparison of the performance data sample.

8. A device in accordance with claim 7, wherein the communications interface configured to receive an operating condition at a plurality of times from one or more sensors associated with a grouping of wind turbines similar to the first wind turbine is further configured to receive an operating condition at a plurality of times from one or more sensors associated with a grouping of wind turbines situated in a similar geographic location to the first wind turbine, a grouping of wind turbines installed in the same year as the first wind turbine, and, a grouping of wind turbines being the same model as the first wind turbine.

9. A device in accordance with claim 7, wherein the communications interface configured to receive an operating condition at a plurality of times from one or more sensors associated with a grouping of wind turbines similar to the first wind turbine comprises a communications interface configured to receive an operating condition at a plurality of times from one or more sensors in a respective wind turbine associated with a grouping of wind turbines similar to the first wind turbine.

10. A device in accordance with claim 7, wherein the processor is further programmed to assign a severity level to the produced sensor error.

11. A device in accordance with claim 10, wherein the processor is further programmed to define a reasonable range of data for each of the at least one sensors.

12. A device in accordance with claim 11, wherein the processor is further programmed to determine if the performance data sample of the first wind turbine is within the defined reasonable range.

13. One or more computer-readable storage media having computer-executable instructions embodied thereon, wherein when executed by at least one processor, the computer-executable instructions cause at least one processor to:
    monitor data acquired by at least one sensor in a first wind turbine, wherein the data is calculated to produce a value for a predetermined amount of time;
    monitor data acquired by at least one sensor in a grouping of wind turbines similar to the first wind turbine, wherein the monitored data corresponds to the monitored data of the first wind turbine and is combined for a predetermined amount of time; and, compare the monitored data of the first wind turbine with the monitored data of the grouping of wind turbines.

14. One or more computer-readable storage media in accordance with claim 13, wherein when executed by the processor, the computer-executable instructions cause the processor to display the results of the comparison of the monitored data.

15. One or more computer-readable storage media in accordance with claim 13, wherein when executed by the processor, the computer-executable instructions further cause the processor to produce a sensor error if the monitored data of the first wind turbine is more than two standard deviations from the monitored data of the grouping of wind turbines.

16. One or more computer-readable storage media in accordance with claim 15, wherein when executed by the processor, the computer-executable instructions further cause the processor to assign a severity level to the produced sensor error.

17. One or more computer-readable storage media in accordance with claim 13, wherein when executed by the processor, the computer-executable instructions further cause the processor to define a reasonable range of data for each of the at least one sensors.

18. One or more computer-readable storage media in accordance with claim 17, wherein when executed by the processor, the computer-executable instructions further cause the processor to determine if the monitored data of the first wind turbine is within the defined reasonable range.

* * * * *